MAGNETIC AMPLIFIER

Filed April 7, 1955 2 Sheets-Sheet 1

INVENTORS
ROBERT D. TORREY
THEODORE H. BONN

BY Charles C. English

AGENT

MAGNETIC AMPLIFIER

Filed April 7, 1955 2 Sheets-Sheet 2

INVENTORS
ROBERT D. TORREY
THEODORE H. BONN

BY Charles C. English
AGENT

United States Patent Office 2,901,636

Patented Aug. 25, 1959

2,901,636

MAGNETIC AMPLIFIER

Robert D. Torrey and Theodore H. Bonn, Philadelphia, Pa., assignors, by mesne assignments, to Sperry Rand Corporation, New York, N.Y., a corporation of Delaware Application April 7, 1955, Serial No. 499,905

31 Claims. (Cl. 307—88)

This invention relates to magnetic amplifiers and more particularly to such amplifiers which, except for the invention, would inherently have the disadvantages of "ringback." Ringback is an effect often encountered in magnetic amplifiers which reduces the efficiency thereof. It is customary in magnetic amplifiers to employ core material having a substantially square hysteresis loop. The core has one or more windings thereon. The impedance of one of the windings depends on whether the core is operating on a saturated portion of its hysteresis loop or an unsaturated portion thereof. For example, if the core is at positive remanence when a power pulse flows through one of the coils, the core may be driven from positive remanence to positive saturation. Since this is a saturated portion of the hysteresis loop, the coils on the core will have low impedance. If, on the other hand, the core had been at negative remanence when that same power pulse occurred, the power pulse would tend to drive the core from negative remanence toward a point of positive remanence along an unsaturated portion of the hysteresis loop, in which event the coils on the core would have had high impedance.

It follows from the foregoing explanation that in order to have maximum output efficiency, the core must, at the beginning of each power pulse, be at positive remanence and more particularly, at the positive remanence point for the major hysteresis loop of the material as distinguished from the positive remanence point of a minor hysteresis loop of the material. It has been found that when the current through the power winding on the core is suddenly terminated, the distributive capacity of the power winding taken together with the inductive reactance thereof may establish a current which will flow in the power winding for a short period after the termination of the power pulse. This current may flow in the power winding in a direction opposite that of the main power pulse current and will therefore tend to drive the core from positive remanence down the hysteresis loop a short distance and leave the core at a point representative of positive remanence on a minor hysteresis loop. In such situation, the next power pulse through the power winding will tend to drive the core from said positive remanence of the minor hysteresis loop to positive saturation. During part of this pulse the core will not be saturated and so there will be less output for a series type amplifier than there would have been if the core had been at positive remanence of the major hysteresis loop at the beginning of the power pulse. The presence of the aforesaid current which drives the core down the hysteresis loop following termination of the power pulse is known in the art as "ringback."

In addition to "ringback" there are other characteristics of a conventional magnetic amplifier that produce the same undesired result as the "ringback" current. For a short interval after the potential at the upper end of the power winding goes negative, there is a very brief surge through the power winding in a direction opposite that of the main power pulse therethrough. This result flows from the so-called "diode enhancement" effect. Moreover, there is a leakage current through the diode which has somewhat the same effect as "ringback." In addition, in some form of magnetic amplifiers, there is certain leakage reactance in the output winding which also has the same effect as the "ringback."

It is a primary object of this invention to eliminate the effect of ringback and/or similar effects in a magnetic amplifier.

Another object of the invention is to eliminate the effect of ringback and/or similar effects in a series type of magnetic amplifier.

Another object of the invention is to eliminate the effect of ringback and/or similar effects in a parallel type of magnetic amplifier.

Still another object of the invention is to increase the efficiency of a magnetic amplifier.

Other objects of the invention will appear as this description proceeds.

The following description sets forth several ways of reducing or eliminating the effect of ringback in a magnetic amplifier. One way is to provide a small bias which will supply a magnetizing force to the core which is about equal and opposite to the magnetizing force created by the ringback current. Another way of eliminating the effect of ringback is by applying damping means to the circuit. However, the invention is not limited to these two ways of carrying it out. In its broadest aspect, the invention contemplates the connection of means to one of the coils on the magnetic amplifier to cancel or damp the effect of the ringback current. The invention, as just described, is distinguished from the way of overcoming ringback in which the circuit is so arranged that the ringback effect never takes place at all. In other words, the present invention contemplates means for cancelling or damping the effect of the ringback currents without preventing their existence, in contrast to overcoming ringback by providing a magnetic amplifier in which ringback currents do not exist at all.

The means just described for eliminating the effects of "ringback" will also eliminate some or all of the other undesired effects, previously mentioned, such as diode enhancement, leakage in the diode, etc.

Figure 8:
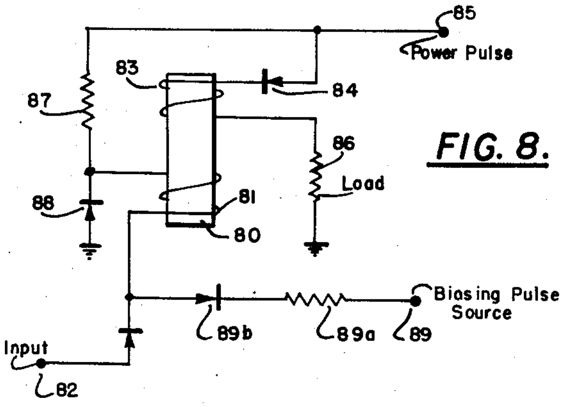
Figure 8 is a modified form of Figure 7.
Figure 9:
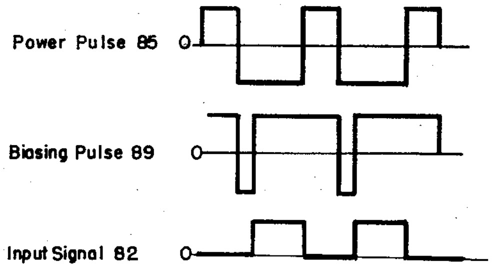

Figure 9 is a timing diagram for the input signals 82, the power pulses 85 and the biasing pulses 89 of Figure 8.

Figure 10:
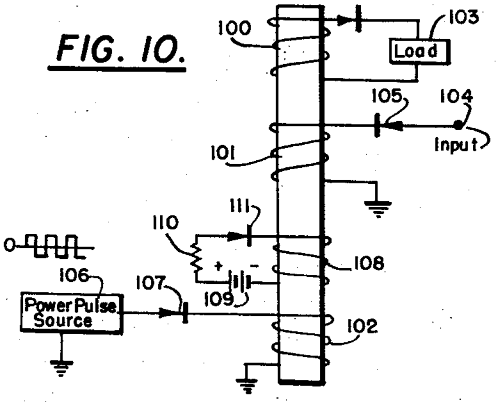

Figure 10 is a modified form of the invention.

Figure 1:
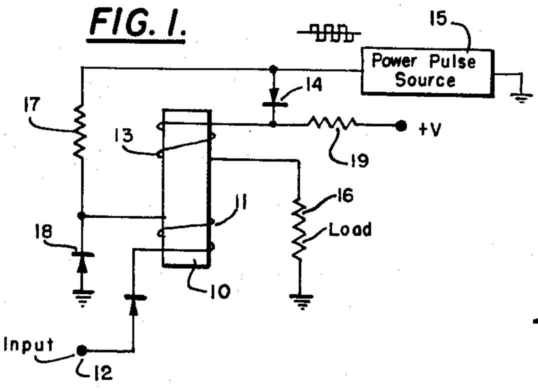
Figure 1 is a schematic diagram of a complementing series type magnetic amplifier in which means for cancelling the effect of ringback currents has been added, all as contemplated by the invention.
Figure 1A:
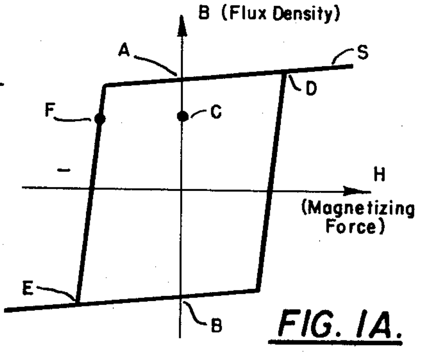
Figure 1A is an idealized hysteresis loop for the core material of Figure 1 as well as for the core materials of the several modified forms of the invention hereinafter described.

Figure 1 is a schematic diagram of a complementing series type of magnetic amplifier. The following is a theoretical explanation of the construction and mode of operation of this magnetic amplifier. The magnetic core 10 may be made of a variety of materials, among which are the various types of ferrites and the various magnetic tapes, including Orthonik and 4–79 Moly-Permalloy. These materials may have different heat treatments to give them different properties. The magnetic material employed in the core should preferably, though not necessarily, have a substantially rectangular hysteresis loop (as shown in Figure 1A). Cores of this character are now well known in the art. In addition to the wide variety of materials available, the core may be constructed in a number of geometries including both closed and open paths; for example, cup-shaped, strips, and toroidal-shaped cores are possible. Those skilled in the art understand that when the core is operating on the horizontal (or substantially saturated) portions of the hysteresis loop, the core is generally similar in operation to an air core in that the coil on the core is of low effective impedance. On the other hand, when the core is operating on the vertical (or unsaturated) portions of the hysteresis loop, the effective impedance of the coils on the core will be high.

The source 15 of power pulses generates a train of equally spaced square wave alternating current pulses as shown. If it be assumed that at the beginning of any given positive pulse the core has residual magnetism and flux density as represented by point A on the hysteresis loop of Figure 1A, the positive power pulse will drive the core from point A to saturation region S. At the conclusion of the pulse, the magnetization will return to point A. Successive positive pulses from power source 15 will flow through rectifier 14, power winding 13 and load 16, repeatedly driving the core from positive remanence point A to saturation region S. During the interval in which the core is being driven from A to S, the core is operating on a relatively saturated portion of the hysteresis loop, whereby the effective impedance of coil 13 is low. Hence, power pulses will flow from source 15 to load 16 without substantial impedance. If, however, during the interval between two positive power pulses, a positive pulse is received at the input 12, it will pass through the coil 11, and diode 18 to ground. This follows from the fact that during the spaces between positive excursions of source 15, the source goes negative, thus tending to draw current from ground through rectifier 18, resistor 17 to source 15, whereby the rectifier 18 is made conducting and thus a positive pulse fed to the input will tend to flow toward the cathode of rectifier 18. The input signal flowing through coil 11 will magnetize the core negatively driving it from point A to point E on the hysteresis loop of Figure 1A. At the conclusion of this input pulse the core will be at negative remanence point B. The next positive power pulse from source 15 is just sufficient to drive the core from point B to point D. Since this is a relatively unsaturated portion of the hysteresis loop, the coil 13 will have high impedance during this pulse and the current flow therethrough will be very low. At the conclusion of that pulse the magnetization will theoretically return to zero value A. If no signal appears on the input immediately following the last named positive power pulse, the next positive power pulse will drive the core to saturation at S and will give a large output at the load 16.

Consequently, it is clear that the magnetic amplifier of Figure 1 will feed large pulses to the load in response to each positive pulse from source 15, except that immediately after the receipt of an input pulse at the input 12. Following an input pulse at 12, the next positive power pulse from source 15 will be absorbed by the high impedance of coil 13. As stated above, the foregoing is a theoretical explanation of the operation of a complementing series type magnetic amplifier. In actual practice, coil 13 not only has inductive reactance but also distributed capacity and therefore it is possible for a current to flow in the coil after a positive excursion of the power pulse has ceased, for reasons now to be explained. The potential of each positive excursion drops steeply as it approaches the zero potential axis, and continues immediately beyond that axis. The rectifier 14 is conducting as long as the source 15 is positive, and continues to have a current flow therethrough in the positive direction for a very short period after the potential of the power source 15 goes negative. Shortly after the potential of source 15 goes negative, the current in a positive direction through the coil 13 drops to zero and rectifier 14 stops conducting. However, the distributed capacity of the coil 13 is charged so that the lower end thereof is positive and the upper end negative. The rectifier 14 is now cut off since the potential of source 15 is far negative. Thereupon the energy stored in the distributed capacity of the coil 13 will discharge through the coil and a small current will flow through the coil 13 in a reverse direction from that which was taken by the main positive power pulse from source 15. This current, known as the ringback current, is in a direction opposite to the direction of the power pulses and therefore tends to drive the core 10 down the hysteresis loop. For example, at the termination of a positive power pulse the core will be at positive remanence A. The ringback current may tend to drive the core from point A to point F on the hysteresis loop and at the termination of the ringback current the core would move to point C (of Figure 2) which is positive remanence on a minor hysteresis loop. Therefore, the next positive pulse from source 15 will tend to drive the core from point C to saturation region S and during part of that pulse the core will be operating on an unsaturated portion of the hysteresis loop and therefore coil 13 will have high impedance to that portion of the pulse. This will reduce the output of the magnetic amplifier and therefore lower the efficiency thereof. In other words, in the actual circuit as distinguished from the theoretical circuit, the core will operate for part of each positive pulse below the optimum saturation level of A to S and therefore the coil 13 will have higher impedance than it would have in the theoretical circuit. This means that the output at the load 16 is less than would be true for the theoretical circuit.

According to the invention, the effect of ringback is cancelled in the case of Figure 1 by providing a bias current which flows from source +V through resistor 19, coil 13, load 16, to ground. This bias current produces a positive magnetizing force in the core 10 equal to the maximum negative magnetizing force of the ringback current. In other words, since the ringback current may produce enough negative magnetizing force to drive the core from point A to point F from which the core will return to positive remanence C (on a minor hysteresis loop), the positive bias established by the source +V is sufficient to prevent the ringback current from driving the core more negatively than point A. Consequently, at the conclusion of each positive pulse of source 15, a ringback current exists in the coil 13. This current may have only a negative excursion, or a positive excursion, or both. However, during the period of this current the core always has a positive magnetizing force thereon since the source +V prevents the ringback current from driving the core along the H axis to a negative value. Hence, the core always returns to point A on its major hysteresis loop at the conclusion of each positive power pulse. The next positive power pulse finds the core at point A (or in some cases on the line A—S) and drives it to saturation region S. Therefore, the coil 13 always has a minimum impedance to successive positive pulses from source 15. While the bias current is often equal to or slightly greater than the ringback current, it may be less in which case the desirable results herein described are partially achieved. Very good results are achieved as long as the bias current holds the core on a horizontal portion of its hysteresis loop (during periods when no input signal is present).

The invention requires that input signals at 12 be of slightly larger magnitude than would be required in the theoretical circuit (which did not have source +V and resistor 19). The disadvantage of requiring a slightly increased input current is more than overcome by the elimination of ringback.

In addition to the "ringback" current which has just been mentioned, there are other effects which produce the same result as the "ringback" effect. For example, as the potential of source 15 drops sharply from positive to negative, the rectifier 14 is abruptly cut off. In this situation there may be a number of free electrons in the diode 14 which will cause a momentary surge through the coil 13 in a direction opposite to the main positive power pulse. This is the "diode enhancement" effect. Moreover, the rectifier 14 may have a small back leakage current which will flow through coil 13 throughout the entire time that source 15 is having a negative excursion. The diode enhancement effect, as well as the leakage effect, produces undesirable results which are eliminated by the same means as eliminates the ringback effect.

This is true not only in connection with Figure 1 but in connection with the other figures as well, and consequently it is understood that when mention is made of eliminating the ringback effect it is understood that the same means will aid in eliminating these other effects.

Figures 2, 3:
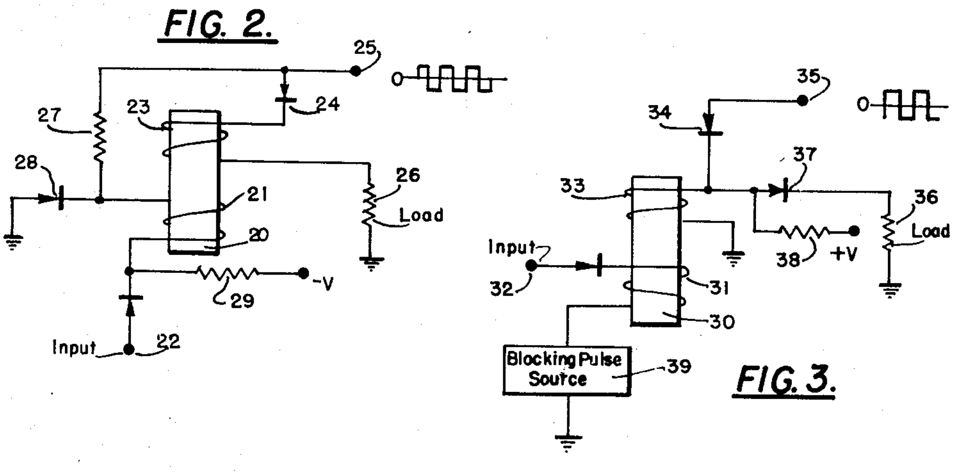
Figure 2 is a schematic diagram of a modified form of Figure 1.
Figure 3 is a schematic diagram of a non-complementing parallel type magnetic amplifier employing the invention.

Figure 2 is a modified form of the invention in which core 20, coil 21, input 22, coil 23, rectifier 24, source 25, load 26, resistor 27 and rectifier 28 respectively are similar in construction and mode of operation to the corresponding parts of Figure 1. The only difference between Figures 1 and 2 is that the means for overcoming ringback is connected to coil 21 instead of to coil 23. In this case, source —V is connected to resistor 29 and tends to cause flow of current from ground through rectifier 28, coil 21, resistor 29, to source —V. This current establishes a positive magnetizing force in the core 20 which is equal to the positive magnetizing force produced in the core 10 of Figure 1 by the source +V and the resistor 19. It follows that the modes of operation of Figures 1 and 2 are therefore substantially the same.

Figure 5:
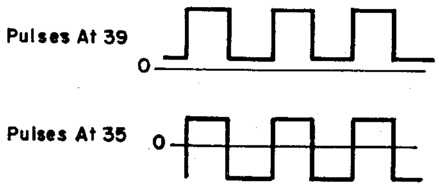
Figure 5 is a timing diagram for the power and blocking pulses of Figures 3 and 4.

Figure 3 illustrates application of the invention to the non-complementing parallel type of magnetic amplifier. In this figure the core 30 has input coil 31 connected to the input 32. Power winding 33 is connected through rectifier 34 to source 35 of constant current pulses. Load 36 is connected through rectifier 37 to the cathode of rectifier 34. The source +V together with resistor 38 constitutes the means for eliminating the effect of ringback, and source 39 is a source of blocking pulses. The relationship between the pulse generators 35 and 39 is shown in Figure 5.

In Figure 3, if it is assumed that no signals are received at input 32, the positive going pulses of source 35 will pass through rectifier 34 and coil 33 driving the core to positive saturation region S of Figure 1A. At the conclusion of each positive pulse the core would tend to return to positive remanence point A on the major hysteresis loop of Figure 1A. The next positive pulse would drive the core from point A to saturation region S. Hence the core operates on the saturated portion thereof and coil 33 has low impedance and consequently very small potential is developed across it. The source 35 is a constant current source which means that it always delivers the same current irrespective of the change of impedance of the load applied to it. In one form, a constant current source may be a pulse generator such as 35 with resistance in its circuit which is high as compared with the resistance of the load connected to the source so that variations in the load impedance have small effect as compared with the resistance of the circuit. As a result, the current flowing from source 35 is relatively constant irrespective of whether coil 33 has high impedance or low impedance. Therefore, when coil 33 has low impedance the current through it will set up practically no voltage across it and the potential output of the source 35 will be low due to the large drop in the resistance of the source itself. Hence there will be only a nominal potential across the load 36. If, however, during the spaces between two pulses of source 35 a signal appears at input 32, it will pass through coil 31 to ground and revert the core from point A to point B on the hysteresis loop of Figure 1A, whereby the next pulse from source 35 flowing through coil 33 will drive the core along the unsaturated portion from point B to point D, whereupon the coil 33 will have high impedance. If the resistance of the load 36 is low compared with that of coil 33, then practically all of the constant current of source 35 will flow through the load 36.

In the circuit of Figure 3 the flow of current through coil 33 may induce a potential in coil 31 which would tend to cause a flow of current in the input circuit. In some cases this may adversely affect the means for generating input signals and consequently it is sometimes desirable to eliminate the effect of this induced potential. This is accomplished by providing the blocking pulse source 39 (in series with the coil 31) having a wave shape as shown in Figure 5. The source 39 produces positive pulses which cut off the cathode of the input rectifier and prevent flow of current in the input circuit during the intervals when pulses are flowing through coil 33. Hence, there is no current flow in the input circuit during the time when the current flowing through coil 33 is likely to induce a potential in coil 31.

Ringback may occur in Figure 3 in essentially the same way that it occurred in Figure 1. In other words, if there is a succession of input pulses at 35 without any input signals between them, each power pulse will tend to drive the core 30 to saturation. At the end of the power pulse the sharp drop of potential may establish ringback current flow in coil 33. It is possible that the ringback current may drive the core from point A to point F on the hysteresis loop and that the core will return to positive remanence point C on a minor hysteresis loop where it will remain until the next positive power pulse drives it from there to saturation at S. This results in reduced efficiency since the core 30 is not operating at the optimum level A to S during the positive pulses and therefore the coil 33 has greater than its minimum impedance. It follows that coil 33 will not shunt all of the current of source 35 to ground and will allow a greater portion of it to flow to the load 36 than would be the case if the core remained at point A during the spaces between positive power pulses. To overcome the effect of the ringback current the source +V together with resistor 38 may be added to the circuit. This causes flow of current from source +V, resistor 38 through coil 33 to ground and provides a positive magnetizing force which is large enough to overcome the effects of the ringback currents. Therefore, the core never has a negative magnetizing force upon it, in the absence of signals at the input 32. The magnetizing force H of the core never goes negative with respect to point A, and positive pulses of the source 35 drive the core from point A to point S. Consequently, the magnetic amplifier more nearly approaches its theoretical optimum mode of operation than is the case without the source +V and the resistor 38.

Figure 4:
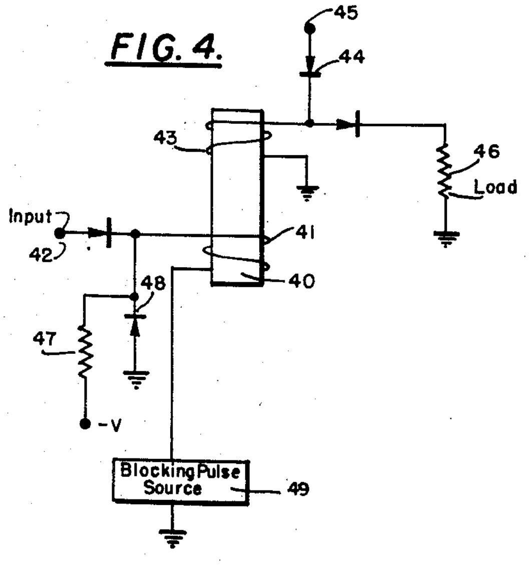
Figure 4 is a schematic diagram of a modified form of Figure 3.

Figure 4 is a modified form of Figure 3 in which the means for providing the biasing magnetizing force is connected to the input coil 41 instead of to the power coil 43. Otherwise the circuit of Figure 4 is identical to that of Figure 3. In other words, core 40, coil 41, input 42, coil 43, rectifier 44, source 45, and load 46 correspond to core 30, coil 31, input 32, power winding 33, rectifier 34, source 35, and load 36 of Figure 3. In Figure 4 the positive biasing magnetizing force is supplied by source —V connected to resistor 47. This causes flow of current from ground through blocking pulse source 49, coil 41, resistor 47 to source −V and thus establishes a positive magnetizing force in the core sufficient to cancel the negative going excursions of any ringback currents that might be set up in coil 43.

The relationship of the potentials of sources 45 and 49 of Figure 4 is the same as the relationship of the potentials of sources 35 and 39 of Figure 3 and is illustrated in Figure 5. Rectifier 48 is a ground clamp and may be omitted, especially if there is a ground clamp elsewhere in the circuit.

Figure 6:
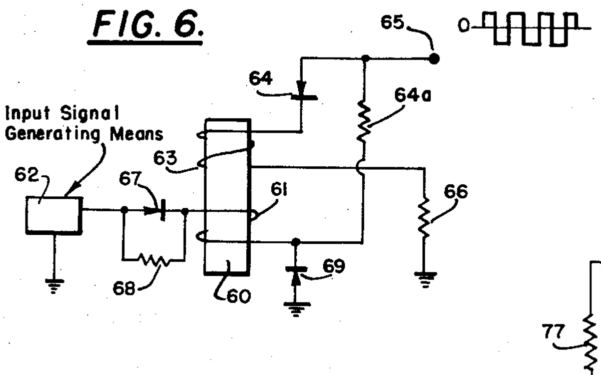
Figure 6 is a schematic diagram of a complementing series type magnetic amplifier having means for damping the oscillations which cause ringback.

Figure 6 is a modified form of the invention in which there is a complementing series magnetic amplifier having a core 60, an input coil 61, an input signal generator 62, a power winding 63, a rectifier 64, alternating current square wave source 65, load 66, input rectifier 67, and a rectifier 69 in series with the input circuit. Resistor **64*a* connects the source 65 to the cathode of rectifier 69. The aforesaid parts have a construction and mode of operation identical with corresponding parts of Figure 1 (except of course that the means for cancelling the effect of ringback, +V and 19 of Figure 1, has been omitted). The means for overcoming the effect of ringback in this case is a resistor 68 shunted across the input rectifier 67**.

When the power pulse from source 65 abruptly falls to zero and rectifier 64 is cut off, the ringback current which is set up in coil 63 then follows during the space between positive pulses of source 65. This oscillatory current tends to drive the core negatively and in doing so tends to induce potential in coil 61. By having a circuit of low resistance across coil 61, the latter coil will oppose rapid change of flux therethrough and will thereby tend to prevent the ringback currents from driving the core negatively. Consequently, by placing resistor 68 across rectifier 67, damping means have been added to the input circuit which tend to dampen the oscillations set up in coil 63 and thereby reduce the effect of the ringback currents. It is assumed in this case that the input signal generating means 62 has low impedance.

Figure 7:
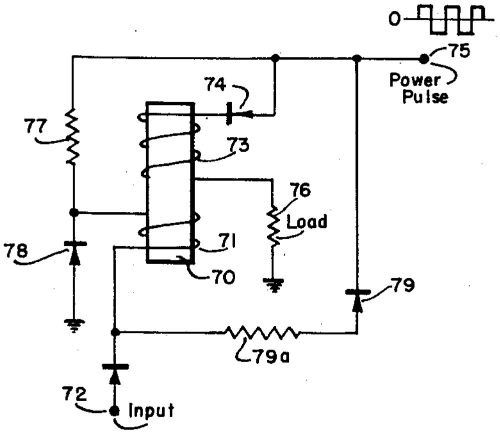
Figure 7 is a schematic diagram of a complementing series type magnetic amplifier having modified means for cancelling the effect of the ringback currents.

Figure 7 illustrates a complementing magnetic amplifier having a core 70, an input coil 71, an input terminal 72, power winding 73, a rectifier 74, source of power pulses 75, load 76, resistor 77 and rectifier 78. These parts function the same as the corresponding parts of Figure 1. The difference between Figure 1 and Figure 7 is in the means for providing a biasing current to the coil means on the core. The source +V, together with resistor 19 of Figure 1, is replaced by the rectifier 79 and the resistor **79*a* of Figure 7. In Figure 7, the positive excursions of the source 75 flow through rectifier 74, coil 73, to the load 76, and if there are no input currents these power pulses repeatedly drive the core to saturation. During the spaces between positive excursions of the source 75, the source has negative excursions which cause flow of current from ground to rectifier 78, coil 71, resistor 79*a*, rectifier 79, to source 75. The resistor 79*a* has such high resistance that the current flow through the aforesaid path is so limited that it sets up a magnetizing force substantially equal and opposite to the maximum negative magnetizing force created by the ringback currents which occur in coil 73. Hence, the effect of these ringback currents is cancelled and the core drops back to positive remanence point A (of its major hysteresis loop) at the conclusion of each positive excursion of source 75. In view of rectifier 79 there is no current flow in the input winding 71 during the positive excursions of the source 75**.

Figure 8 is a further modified form of the invention in which the core 80, input coil 81, input terminal 82, power winding 83, rectifier 84, power source 85, load 86, resistor 87 and rectifier 88 correspond to similar parts of Figure 1. The difference between Figures 1 and 8 is in the means of supplying the compensating magnetizing force. In Figure 8 a biasing pulse source 89 has a waveform relative to power pulse source 85, as shown in Figure 9. This biasing pulse source normally cuts off rectifier **89*b* by supplying a positive potential to the cathode of said rectifier. However, during brief intervals following each positive excursion of source 85, the biasing pulse source 89 moves sharply negative, at which time a current flows from ground through rectifier 88, coil 81, rectifier 89*b*, resistor 89*a*, to biasing pulse source 89. It is noted that this biasing pulse goes negative and causes a current flow through the input winding only for a very brief period and that this brief period corresponds to the duration of the ringback currents which appear in coil 83. Hence during the brief period in which ringback currents are likely to appear in coil 83, there is a large positive magnetizing force set up by coil 81, due to the biasing pulse source 89**, which drives the core positively during this brief interval and prevents the ringback currents from applying a negative magnetizing force to the core.

It is noted that Figures 3 and 4 show how the principles of Figures 1 and 2 may be applied to the parallel type of magnetic amplifier. The magnetic amplifiers of Figures 6, 7, and 8 are shown as complementing series magnetic amplifiers; however, the damping means 68 of Figure 6, or the compensating means 79 and **79*a* of Figure 7, or the biasing pulse source, etc. 89, 89*a*, and 89*b*** of Figure 8, could be applied to parallel non-complementing magnetic amplifiers, for example.

Figure 10 shows how the invention may be applied to a parallel type of amplifier. The core has three main coils, 100, 101, and 102. The output winding 100 is connected to a load 103. The input winding 101 is connected to an input terminal 104 through a rectifier 105. The power winding 102 is connected to a square wave alternating current power source 106 through a rectifier 107. The parts mentioned so far, in connection with Figure 10, are known in the prior art and work as follows. In the absence of any signals at the input 104, the positive excursions of source 106 will flow through coil 102 and will drive the core to saturation. Between positive excursions of source 106, the core will tend to return to positive remanence. Since the core is normally operating between positive remanence and positive saturation, there is little change of flux linking coil 100 and consequently little potential induced therein and no output at the load 103. On the other hand, if during spaces between positive excursions of source 106, signals appear at the input 104, there will be input currents in coil 101 that will reset the core during the spaces between positive excursions of source 106. Therefore, whenever source 106 goes negative, the pulse in coil 101 will reset the core to negative saturation and when the source 106 goes positive the core will be driven toward positive saturation. As the core moves alternately from positive to negative saturation there will be rapid changes of flux linking coil 100 and a large induced potential in coil 100 and applied to load 103. The operation of Figure 10 as just described is somewhat theoretical, since there is the ringback and similar effects in this figure the same as in the other figures. In addition, there is an additional effect producing the same result as the ringback effect. This additional effect is that the leakage inductance of the coil 100 may allow a small current to flow through that coil from the load 103. Such current may be a reflection of the current fed to said load by said coil, or it may be due to some signal that is induced in or generated in the load by some other source of the complete machine of which the load 103 is a part. All of the undesirable effects described in connection with Figure 10 tend to set the core to positive remanence on a minor hysteresis loop, instead of positive remanence on the major hysteresis loop, during the spaces between power pulses, when there is no input signal at 104. Hence, each positive excursion of source 106 drives the core from positive remanence of a minor hysteresis loop to positive saturation and in so doing produces a small change of flux in the core and thereby induces a small potential in output coil 100. This small undesired potential is greatly reduced if the core drops back to positive remanence on the major hysteresis loop during the spaces between positive excursions of source 106 instead of dropping back to positive remanence of a minor hysteresis loop.

Suitable biasing means may be applied to the core of Figure 10 in order to insure that it never falls below positive remanence of the major hysteresis loop in the absence of a signal at the input 104. Such biasing means may consist of coil 108, battery 109, resistor 110 and rectifier 111. The number of turns on the coil 108, the potential of the battery 109, and the resistance of the resistor 110 are so selected that a small biasing magnetizing force is applied to the core in the same direction as the magnetizing force due to the positive power pulses flowing through coil 102. Moreover, the biasing magnetizing force is substantially equal and opposite to the combined currents due to ringback, diode enhancement, leakage of the rectifier 107, and leakage inductance of coil 100, etc.

As shown in Figure 10, the biasing winding 108 is separate from the other ones. This of course could be done in connection with any of the other modified forms of the invention. It is also noted that in connection with Figure 10 any one of the windings 100, 101, and 102 could be connected to suitable biasing means so that the bias current would flow therethrough, instead of the separate biasing winding 108 being used.

We claim to have invented:

1. In a magnetic amplifier, a saturable core, a source of spaced power pulses, coil means on the core connected to said source and fed with said pulses whereby said core is regularly subjected to a magnetomotive force in a first direction, said coil means having distributed capacity and inductive reactance such that said pulses cause a transient current in the coil means flowing in a direction opposite to that effected by said power pulses, whereby said core is subjected to an undesired magnetomotive force tending to reduce the remanent flux density of the said core during the spaces between power pulses, and means for producing an auxiliary magnetomotive force in said core during the spaces between said power pulses, said auxiliary magnetomotive force being substantially equal and opposite to that effected by said transient current thereby to prevent said transient current from lowering the remanence flux density of the said core during the spaces between power pulses.

2. In a magnetic amplifier, a saturable core, a source of spaced power pulses, coil means on the said core connected to said source and fed with said pulses, said coil means having distributed capacity and inductive reactance such that said pulses cause a transient current in the said coil means tending to reduce the remanence flux density of the core assumed during the spaces between power pulses, and means connected to the said coil means for producing an auxiliary magnetomotive force in said core in the same direction as that effected by said power pulses, said last named means being operative intermediate the occurrence of said power pulses thereby to prevent said transient current from lowering the remanence flux density of the said core during the spaces between power pulses.

3. A magnetic amplifier as defined in claim 5 in which the last named means comprises damping means coupled to one of said windings.

4. A magnetic amplifier as defined in claim 2 in which the last named means comprises a source which passes a bias current through the coil means in a direction opposite to that of said transient current in the said coil means.

5. In a magnetic amplifier, a saturable core having a substantially rectangular hysteresis loop; a series circuit including a source of alternating current power pulses, a power winding on said core, and a rectifier; said series circuit having the characteristic that on alternate half-cycles of said source said power winding tends to apply a magnetizing force to said core in one direction and on the other half-cycles tends to apply a smaller magnetizing force to the core in the other direction; said smaller magnetizing force tending to drive said core from a desired operating point on its major hysteresis loop to an undesired operating point on a minor hysteresis loop thereof; an input winding on said core; and means connected to one of said windings to at least partially cancel said second-named magnetizing force whereby the core will remain on its major hysteresis loop during normal operation of the said magnetic amplifier.

6. A magnetic amplifier as defined in claim 5 in which the last named means comprises a source which passes a direct current through the power winding and sets up magnetizing forces in the core during said other half-cycles in the same direction as the magnetizing forces set up by the power pulses during said alternate half-cycles.

7. A magnetic amplifier as defined by claim 6 having a load; the source of spaced power pulses, the power winding and the load being in series.

8. A magnetic amplifier as defined in claim 5 in which the last named means comprises a source which passes direct current through the power winding and sets up a magnetizing force in the core in the same direction as the magnetizing forces set up by the power pulses during said alternate half-cycles; and a load; the source of spaced pulses and the power winding being in series with each other, the load being shunted across the power winding.

9. A magnetic amplifier as defined in claim 5 in which the last named means is a source which passes a direct current through the input winding and sets up a magnetizing force in the core in the same direction as the magnetizing forces set up by the power pulses during said alternate half-cycles.

10. A magnetic amplifier as defined in claim 9 having a load; the source of spaced power pulses, the power winding and the load being in series.

11. A magnetic amplifier as defined in claim 5 in which the last named means comprises a source which passes direct current through the input winding and sets up a magnetizing force in the core in the same direction as the magnetizing forces set up by the power pulses during said alternate half-cycles; and a load; the source of spaced pulses and the power winding being in series with each other, the load being shunted across the power winding.

12. A magnetic amplifier as defined in claim 5 having a rectifier in series with the input winding, the last named means being shunted across said rectifier and providing a circuit of sufficiently low impedance across the input winding as to dampen any transient currents appearing in the power winding.

13. A magnetic amplifier as defined in claim 5 having a rectifier in series with said input winding, the last named means comprising a resistor shunted across said rectifier to thereby provide a low impedance circuit across the input winding which will dampen any transient currents set up in the power winding.

14. A magnetic amplifier as defined in claim 5 in which the first-named source is an alternating current source and in which the last-named means includes a rectifier and resistor connecting said first-named source to the input winding, said first-named source having a rectifier connecting it to said power winding, said rectifiers having such polarities that they pass currents on alternate half cycles, said resistor having such value and being connected to the input winding so that the current flowing through the input winding will set up a magnetizing force in the core in the same direction as the magnetizing force set up by the flow of power pulses through the power winding and of such magnitude as to cancel any transient currents appearing in the power winding which have a direction opposite to the flow of power pulses through the power winding.

15. A magnetic amplifier as defined in claim 5 in which the last-named means comprises a biasing pulse source separate from the first-named source and connected to the input winding, said biasing pulse source passing current through the signal winding for a limited part of the space between power pulses and being operative to establish a magnetizing force in the said core tending to cancel that portion of the current in the coil due to transients therein.

16. In a magnetic amplifier, the combination comprising a saturable core having a substantially rectangular hysteresis loop, a source of spaced power pulses, a coil on said core in series with said source and having inductive reactance and distributed capacity whereby transient currents tend to flow in said core in a direction opposite to that effected by said power pulses for a short period following each power pulse, and means for applying a biasing magnetizing force to the core in the same direction as the magnetizing forces due to the said power pulses, said biasing magnetizing force having an amplitude of the same order of magnitude as that of the magnetizing forces effected by the said transient currents.

17. A magnetic amplifier as defined in claim 16 in which the last-named means includes means applying said biasing magnetizing force for limited portions of the spaces between said power pulses when said transient currents are likely to occur.

18. In a magnetic amplifier, the combination comprising a saturable core having a substantially rectangular hysteresis loop, a source of spaced power pulses, means including a power winding on the core fed by said power pulses and tending to produce a magnetizing force in one direction on alternate half-cycles and a smaller opposing magnetizing force during other half-cycles, said smaller magnetizing forces tending to set said core from a desired remanence point on its major hysteresis loop to an undesired remanence point on a minor hysteresis loop during the spaces between said power pulses, a signal input, said core being repeatedly driven to saturation on alternate half-cycles in the absence of a signal at said input, means for selectively reverting the core from a first remanence point to a second remanence point on its major hysteresis loop during the spaces between power pulses in response to a signal at said input, a load connected to the power winding, and means operative intermediate said power pulses for opposing said smaller magnetizing forces thereby to insure that the said core remains near to said first remanence point on its major hysteresis loop during the spaces between said power pulses in the absence of a signal at said input.

19. In a magnetic amplifier as defined in claim 18, said load being shunted across said power winding.

20. In a magnetic amplifier, the combination comprising a core, an output winding on the core, an input winding on the core, a power winding on the core, a source of alternating current power pulses, a rectifier connecting said source to said power winding, said rectifier being poled to permit selected half cycles of said alternating source readily to effect current flow therethrough and to oppose current flow from said source during opposite half cycles of said source, and means for applying a biasing magnetizing force to said core during those half-cycles of said source when said rectifier opposes flow of current therethrough from said source, said biasing magnetizing force being in the same direction as the magnetizing forces set up by those power pulses which effect ready current flow through the said rectifier.

21. A magnetic amplifier comprising a core of magnetic material having a power winding thereon, a source of alternately positive and negative going power pulses coupled to said power winding, rectifier means in series with said source and said power winding whereby power pulses of a preselected polarity are operative to effect current flow in said power winding in a first direction thereby to effect desired flux changes in said core, said power pulses being operative to effect transient current flow in said power winding in a second direction opposite to said first direction during occurrence of power pulses having a polarity opposite to said preselected polarity, said transient current flow tending to set said core to an undesired hysteretic operating point, and means for producing an auxiliary magnetomotive force in said core in the same direction as that produced by power pulses of said preselected polarity at times intermediate the occurrence of said power pulses of said preselected polarity thereby to oppose the undesired core setting effect of said transient current flow.

22. The combination of claim 21 wherein said last named means is operative for a limited time comprising a portion of the time period separating adjacent pulses of said preselected polarity.

23. A magnetic amplifier comprising a core of magnetic material having a substantially rectangular hysteresis loop, a power winding linked thereto, means for effecting desired current flow in a first direction through said power winding during regularly spaced time intervals whereby said core is caused to traverse certain portions of its major hysteresis loop, said last named means tending to effect undesired current flow through said power winding in a second direction opposite to said first direction at times intermediate said spaced time intervals whereby said undesired current flow tends to set said core from a desired operating point on its major hysteresis loop to an undesired operating point on a minor hysteresis loop thereof, input means selectively operable at intervals between said spaced time intervals and responsive to input signals for driving said core in a direction opposite to that produced by said desired current flow, and means operable at intervals intermediate said spaced time intervals for opposing the core setting effect of said undesired current flow whereby said core is caused to remain at a desired operating point on its major hysteresis loop in the absence of said input signals.

24. A magnetic amplifier comprising a core of magnetic material having a substantially rectangular hysteresis loop, a power winding linked thereto, power pulse means coupled to said power winding for effecting desired current flow through said winding during spaced time intervals, said power pulse means tending at intermediate spaced time intervals to effect undesired transient current flow in said power winding in a direction opposite to said desired current flow whereby said undesired current flow produces an undesired magnetomotive force in said core tending to set said core to an undesired hysteretic operating point, input means selectively operable at said intermediate spaced time intervals and responsive to input signals for driving said core in a direction opposite to that produced by said desired current flow, and means operable at said intermediate spaced time intervals to oppose said undesired magnetomotive force in said core whereby said core remains at a desired hysteretic operating point in the absence of said input signals.

25. In a magnetic amplifier, the combination comprising a saturable magnetic element having a substantially rectangular hysteresis loop, a source of spaced power pulses, first winding means linked to said element and connected to said source and having inductive reactance and distributed capacitance whereby transient currents tend to flow in said winding means in a direction opposite to that produced by said power pulses for a period following each power pulse, second winding means linked to said element for applying magnetizing forces thereto in a direction opposite to the forces produced by said power pulses in response to input pulses, and means for producing a biasing magnetizing force in said element in the same direction as the magnetizing forces due to said power pulses to oppose the magnetizing forces produced by the said transient currents.

26. A magnetic amplifier combination as defined in claim 25 in which said pulse source produces second spaced power pulses between the first mentioned pulses, said bias applying means includes means coupling said second winding means to said pulses source for energizing said second winding means with said second spaced power pulses.

27. In a magnetic amplifier, the combination comprising a saturable magnetic element having a substantially rectangular hysteresis loop, a source of periodic spaced power pulses, first winding means linked to said element and connected to said source to be energized by said power pulses and having inductive reactance and distributed capacitance whereby transient currents tend to flow in said winding means in a direction opposite to that produced by said power pulses for a period following each power pulse, second winding means linked to said element for applying magnetizing forces thereto in a direction opposite to the forces produced by said power pulses only in response to aperiodic input pulses, and third winding means for applying a biasing magnetizing force to said element in the same direction as the magnetizing forces due to said power pulses to oppose the magnetizing forces produced by the said transient currents.

28. In a magnetic amplifier, the combination comprising a saturable magnetic element having a substantially rectangular hysteresis loop, a source for producing regularly spaced power pulses in certain intervals, means including a power winding linked to said element and fed by said power pulses and tending to produce a magnetizing force in one direction during said certain intervals and a smaller opposing magnetizing force during other intervals, said smaller magnetizing forces tending to set said element from a desired remanence point on its major hysteresis loop to an undesired remanence point on a minor hysteresis loop during the spaces between said power pulses, a signal input, winding means for selectively driving said element in the opposite direction during said other intervals in response to a signal at said input, a load coupled to said power winding and source, said element being repeatedly driven to substantial saturation in one direction by said power pulses during said certain intervals in the absence of a signal at said input, and means operable during said other intervals for opposing said smaller magnetizing forces thereby to insure that said element remains near said first remanence point on its major hysteresis loop during the spaces between said power pulses in the absence of a signal at said input.

29. In a magnetic amplifier, the combination comprising a saturable magnetic element having a substantially rectangular hysteresis loop, a source for producing regularly spaced power pulses during certain intervals, means including a power winding linked to said element and fed by said power pulses and tending to produce during said intervals a magnetizing force in one direction tending to saturate said element, a signal input winding means for selectively driving said element to substantial saturation in the opposite direction in response to irregularly occurring signals at said input during other intervals, a load coupled to said power winding and said source, and means for energizing said input winding means during said other intervals to produce a magnetizing force that is less than and opposite to that produced in response to said input signal whereby said element tends to remain in substantial saturation in the absence of a signal at said input.

30. In a magnetic amplifier, the combination comprising a saturable magnetic element having a substantially rectangular hysteresis loop, a source for producing regularly spaced power pulses during certain intervals, means including a power winding linked to said element and fed by said power pulses and tending to produce during said intervals a magnetizing force in one direction tending to saturate said element, a signal input winding means for selectively driving said element to substantial saturation in the opposite direction in response to irregularly occurring signals at said input during other intervals, a load coupled to said power winding and said source, and means for producing a magnetizing force during said other intervals that is less than and that opposes that force produced in response to said input signal whereby said element tends to remain in substantial saturation in the absence of a signal at said input.

31. In a magnetic amplifier, the combination comprising a saturable magnetic element having a substantially rectangular hysteresis loop, a source for producing regularly spaced power pulses during certain intervals, means including a power winding linked to said element and fed by said power pulses and tending to produce during said intervals a magnetizing force in one direction tending to saturate said element, a signal input winding means linked to said element for selectively driving said element to substantial saturation in the opposite direction in response to irregularly occurring signals at said input during other intervals, a load coupled to said power winding and said source, and bias winding means linked to said element for producing a magnetizing force during said other intervals that is less than and opposite to that produced in response to said input signal whereby said element tends to remain in substantial saturation in the absence of a signal at said input.

References Cited in the file of this patent

UNITED STATES PATENTS

| | | |
|---|---|---|
| 2,704,823 | Storm | Mar. 22, 1955 |
| 2,709,225 | Pressman | May 24, 1955 |
| 2,719,885 | Ramey | Oct. 4, 1955 |
| 2,729,754 | Steagall | Jan. 3, 1956 |